United States Patent
Kinoshita

[11] Patent Number: 6,137,757
[45] Date of Patent: Oct. 24, 2000

[54] DISC REPRODUCING METHOD AND APPARATUS FOR REPRODUCING DATA FROM A DISC USING A CAV SYSTEM AND A CLV SYSTEM

[75] Inventor: Masakatsu Kinoshita, Tokyo, Japan

[73] Assignee: Kabushiki Kaisha Toshiba, Kawasaki, Japan

[21] Appl. No.: 08/812,041

[22] Filed: Mar. 6, 1997

[30] Foreign Application Priority Data

May 13, 1996 [JP] Japan ..................................... 8-117567

[51] Int. Cl.[7] ...................................................... G11B 7/00
[52] U.S. Cl. ................................................ 369/48; 369/50
[58] Field of Search ................................. 369/50, 54, 58, 369/48, 47, 49; 360/73.03

[56] References Cited

U.S. PATENT DOCUMENTS

| | | | |
|---|---|---|---|
| 4,558,375 | 12/1985 | Sontheimer | 369/50 |
| 4,789,975 | 12/1988 | Taniyama | 369/50 |
| 5,136,560 | 8/1992 | Hangai et al. | 369/54 |
| 5,425,014 | 6/1995 | Tsuyuguchi et al. | 369/48 |
| 5,446,724 | 8/1995 | Tabe et al. | 369/48 |
| 5,687,148 | 11/1997 | Uemura | 369/50 |

OTHER PUBLICATIONS

JP 61 099989A—Patent Abstracts of Japan, vol. 010, No. 278, May 19, 1986.

JP 07 235126A—Patent Abstracts of Japan, vol. 096, No. 001, Sep. 5, 1995.

*Primary Examiner*—Thang V. Tran
*Attorney, Agent, or Firm*—Pillsbury Madison & Sutro LLP

[57] ABSTRACT

A disc reproducing method for reproducing a disc carrying signals recorded using a CLV system. The disc reproducing method includes a step of dividing a data area on a disc into an inner data area and an outer data area by using a given track as a border, and a step of reading data from the inner data area using a CAV system while reading data from the outer data area using a CLV system.

18 Claims, 4 Drawing Sheets

DISC REPRODUCING METHOD AND APPARATUS FOR REPRODUCING DATA FROM A DISC USING A CAV SYSTEM AND A CLV SYSTEM

FIELD OF THE INVENTION

BACKGROUND OF THE INVENTION

In recent years there are CD-ROM drives for use in computer peripheral equipment which are capable of high-speed reproduction, such as quadruple-speed reproduction, octuple-speed reproduction and further decuple-speed reproduction. In the case of an apparatus capable of high-speed reproduction of discs on which signals are recorded in a CLV (Constant Linear Velocity) system, a rotation speed of a disc motor varies according to a radial position of a currently read track of the disc. The rotation speed decreases inversely to a radial position of a track. Accordingly, when a track jump operation is to occur, if a normal rotation speed for a target track significantly differs from the rotation speed of the current reading operation, a motor speed must be greatly changed. As a result, a relatively long time is needed to reach the normal rotation speed of the target track.

To reduce an average access time for a track jump operation, an approach of using a disc motor having an enhanced acceleration/deceleration performance was proposed. Thus, the disc motor is capable of producing a high torque. However, such a disc motor having the enhanced acceleration/deceleration performance largely impedes the realization of using small-sized, cheaper CD-ROM drives. Further, if such a CD-ROM drive adapted for such high-speed reproduction is mounted in small portable information handling equipment, users may feel unpleasant because of the mechanical vibrations in the CD-ROM drive due to the high speed rotation of the disc motor.

As another approach for achieving high-speed reproduction without affecting the performance of disc motors, a CAV (Constant Angular Velocity) system reproduction is studied for discs on which signals are recorded by the CLV system. In this approach, because the rotation speed of a disc motor is constant at all track positions on a disc, it is unnecessary to employ a disc motor which has an enhanced acceleration/deceleration performance.

In this case, however, a data reproduction rate varies over a wide range from an innermost track area and an outermost track area of the disc. The data reproduction rate increases as the reproduction progresses toward the outer track. Accordingly, if a motor is rotated at a high speed in order to achieve the high-speed reproduction, a data processing circuit is required to have a much higher data processing capacity. However, because there is an upper limitation to the oscillation frequency of a clock generator which defines the performance of a data processing circuit, there is also a limitation for improving a reproduction speed of a disc reproducing apparatus.

In a conventional disc reproducing apparatus, such as CD-ROMs, the need for high performance disc motors was a stumbling block toward miniaturization, weight-reduction and cost-reduction of the apparatus. In addition, the mechanical vibration occurring in the apparatus when a disc motor is driven at high speed for high-speed reproduction was also a problem which could not be neglected.

SUMMARY OF THE INVENTION

It is, therefore, an object of the present invention to provide a disc reproducing method and an apparatus therefor.

The present invention has been made for solving such problems as described above. It is thus an object of the present invention to provide a disc reproducing method and a disc reproducing apparatus, capable of reducing the size and the cost of the apparatus by reducing a burden of the disc motor and the mechanical vibration occurring therefrom by lowering a maximum rotation speed of a disc motor during high speed reproduction. In order to achieve the above object, a disc reproducing method for reproducing a disc carrying signals recorded at a CLV system, according to one aspect of the present invention, includes a step of dividing a data area on a disc into an inner data area and an outer data area using a given track as a border, and a step of reading data from the inner data area at a CAV system while reading data from the outer data area at a CLV system.

According to the first aspect of the present invention, the reading of data for the inner data area is carried out at the CAV system. Thus, a sufficient data rate is achieved with a rotation speed relatively lower than a rotation speed of the disc motor required during reproduction using a CLV system for the inner data area. Thus, the present invention is able to reduce a burden on the disc motor and the mechanical vibration occurring due to a higher speed rotation of the disc motor.

A disc reproducing method according to a second aspect of the present invention includes a reading of data from the inner data area using a CAV system with a specified angular velocity, which corresponds to the CLV system rotation speed for reading the specific track. The mode change between the CAV system for the inner area and the CLV system for the outer data area is carried out smoothly. Further, the data rate of the signal read from the inner data area using the CAV system is assured to fall within a range of data processing capacity.

A disc reproducing apparatus according to a third aspect of the present invention includes a setting means for setting information for dividing the data area of a disc at a given track as a border into an inner data area including the given track and an outer data area, a determining means for determining which area the position of the currently read track belongs in, a control means for controlling the apparatus so as to read signals using a CLV system if the determined position of the currently read track belongs to the outer data area of a disc divided based on the information set by the setting means, while signals are read using a CAV system if the determined position of the currently read track belongs to the inner data area of a disc divided based on the information set by the setting means. Furthermore, in a disc reproducing, apparatus according to a fourth aspect of the present invention, a control means controls the rotation speed at a constant rotation speed defined in accordance with a radial position of the given track which divides the data area on the disc into the two areas.

According to a third and fourth aspects of the present invention, like the first and second aspects of the invention, it is possible to lower the maximum rotation speed of a disc motor. Thus it is able to reduce a burden on the disc motor and the mechanical vibrations due to the higher speed rotation of the disc motor. Further, a disc reproducing apparatus according to the fourth aspect of the present invention reads data from the inner data area using a CAV system with a specified angular velocity which corresponds to the CLV system rotation speed for reading the specific track. The mode change between the CAV system for the inner area and the CLV system for the outer data area is carried out smoothly. Further, the data rate of the signal read from the inner data area, using the CAV system, is assured to fall within a range of data processing capacity.

A disc reproducing apparatus for reproducing a disc carrying signals recorded using a CLV system according to a fifth aspect of the present invention includes a disc motor for rotating a disc, a setting means for setting information for dividing the data area of a disc, using a given track as a border, into an inner data area, including the given track, and an outer data area, an FG pulse detecting means for detecting FG pulses generated from the disc motor, a determining means for determining to which area the position of the currently read track belongs based on the FG pulses detected by the FG pulse detecting means and a frame synchronizing signal reproduced from the disc, and a control means for controlling the apparatus so as to read signals using a CLV system if the determined position of the currently read track belongs to the outer data area of a disc which is divided based on the information set by the setting means, while signals are read using a CAV system if the determined position of the currently read track belongs to the inner data area of a disc which is divided based on the information set by the setting means.

According to the fifth aspect of the present invention, it is possible to easily design hardware for the means for determining to which area the currently read track belongs, together with the FG pulse detecting means. It becomes also possible to easily design hardware for all of or part of the controlling means, once the hardware has been designed for the determining means.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 1 through 4.

Figure 1:
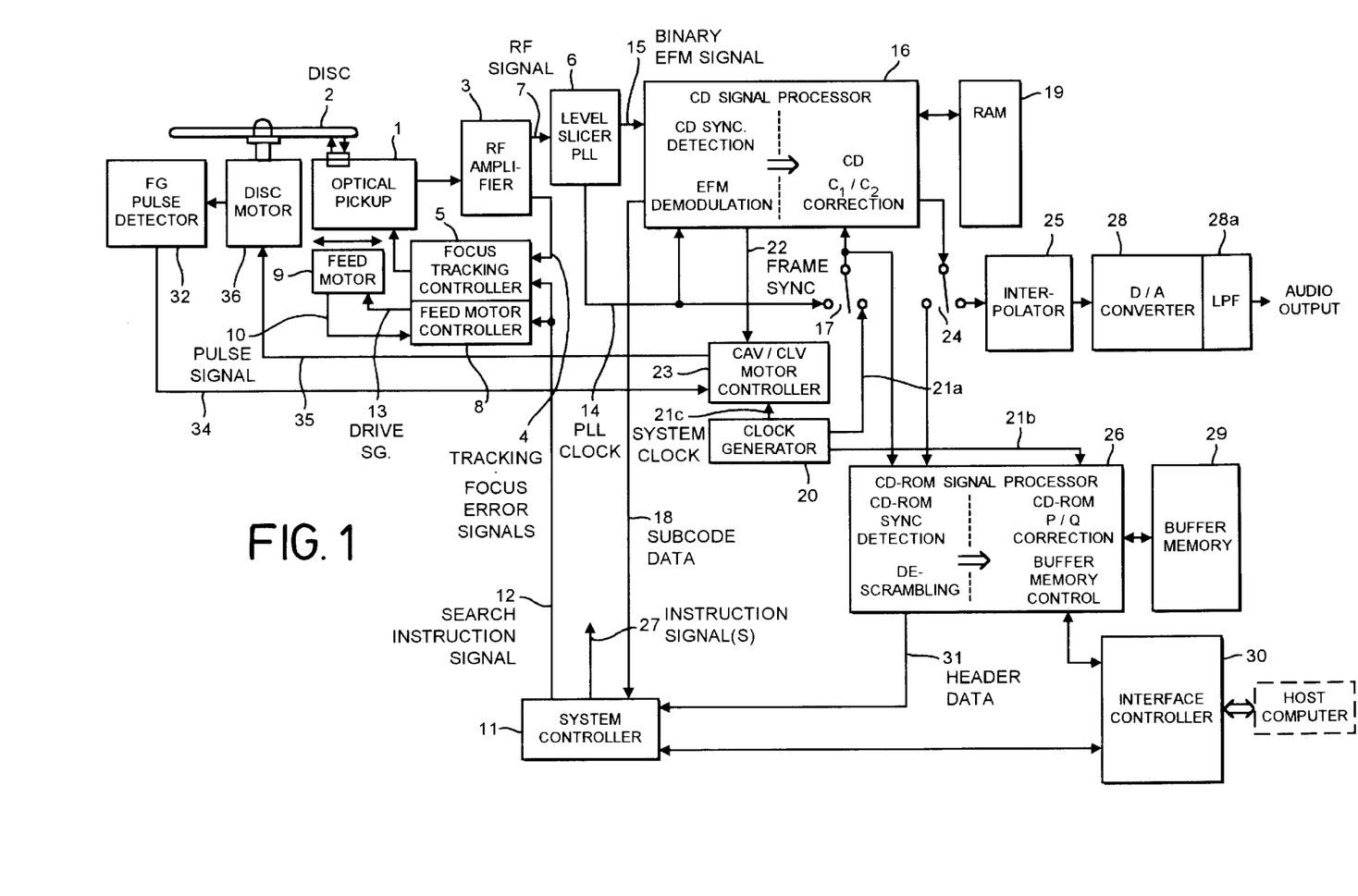
FIG. 1 is a block diagram for illustrating the entire configuration of a CD-ROM reproducing apparatus according to a preferred embodiment of the present invention.

FIG. 1 shows a block diagram for illustrating the entire configuration of a CD-ROM reproducing apparatus according to a preferred embodiment of the present invention.

In FIG. 1, signals read from a disc 2 by an optical pickup 1 are supplied to an RF amplifier 3. The RF amplifier 3 extracts a focus error signal and a tracking error signal 4 from an RF signal 7 output from the optical pickup 1. The RF amplifier 3 then provides the focus error signal and the tracking error signal 4 to a focus tracking controller 5 and also provide the RF signal 7 to a level slicer PLL 6. The focus tracking controller 5 generates a lens control signal from the focus error signal and the tracking error signal 4 supplied from the RF amplifier 3 and supplies the lens control signal to the optical pickup 1.

A feed motor controller 8 generates a driving signal 13 from the tracking error signal component supplied from the focus tracking controller 5, detects a pulse signal 10, varying in proportion to the rotation of a feed motor 9, from the feed motor 9 and a search instruction signal 12 supplied from a system controller 11, and provides the driving signal 13 to the feed motor 9.

The level slicer PLL 6 generates an EFM signal by binarizing the RF signal, and also generates a PLL-based clock 14 in synchronism with the EFM signal for use in reading the EFM signal. A binary EFM signal 15 is supplied to a CD signal processor 16. Further, the PLL-based clock 14 is supplied to both the CD signal processor 16 and a selector 17.

The CD signal processor 16 detects a CD sync signal by using the PLL-base clock 14 and performs a data extraction and an EFM demodulation based on the detected CD sync signal. Then, the CD signal processor 16 extracts only a subcode data 18 from the demodulated data and supplies the subcode data 18 to the system controller 11. The CD signal processor 16 also stores another data, i.e., a main data in a RAM 19 under the control of the PLL-based clock 14. Furthermore, the CD signal processor 16 reads data out of the RAM 19 under the control of clocks supplied through the selector 17 and then performs a correction process on the read data. A detected CD frame sync signal 22 is supplied to a CAV/CLV motor controller 23. On the other hand, the corrected data is supplied to an interpolator 25 or a CD-ROM signal processor 26 via a selector 24.

The selector 17 is switched by an AUDIO-CD/CD-ROM switching instruction signal 27 which is output from the system controller 11. When an AUDIO-CD is addressed by the instruction signal 27, the selector 17 selects a x'tal based clock 21a which is output from a clock generator 20. When a CD-ROM is addressed, the selector 17 selects the PLL-based clock 14 which is output from the level slicer PLL 6 through a production signal path and supplies it to the CD signal processor 16.

The selector 24~is so switched according to the AUDIO-CD/CD-ROM switching instruction signal 27 which is output from the system controller 11. The selector 24 supplies data to the interpolator 25 when the AUDIO-CD is addressed by the instruction signal 27 and supplies data to the CD-ROM signal processor 26 when the CD-ROM is-addressed. The interpolator 25 interpolates data only when data is marked with an error flag and supplies the interpolated data to a D/A converter 28. The D/A converter 28 converts data from digital to analog and outputs the reproduced audio signal through a LPF (low-pass filter).

The CD-ROM signal processor 26 executes CD-ROM sync detection from CD-ROM data, CD-ROM data descrambling, correction of CD-ROM data, write/read control of data to/from a buffer memory 29. The CD-ROM sync detection and the CD-ROM data descrambling are performed under the control of a clock supplied from the selector 17. The data correction process and the write/read control of data to/from the buffer memory 29 are performed under the control of a clock 21b supplied from the clock generator 20. The data read out from the buffer memory 29 is transferred to a host computer, which is external equipment, through an interface controller 30. Further, the CD-ROM signal processor 26 supplies HEADER data 31 which is an address of CD-ROM data to the system controller 11.

The interface controller 30 executes an interface, such as a communication interface to send/receive operating instructions and data with a host computer. The operating instructions are communicated between the system controller 11 and the host computer via the interface controller 30.

The CAV/CLV motor controller 23 generates a control signal 35 based on the AUDIO-CD/CD-ROM switching instruction signal 27 supplied from the system controller 11, the PLL system frame sync signal 22 supplied from the CD signal processor 16, a transmission system clock 21c supplied from the clock generator 20 and an FG pulse 34 which is the output of an FG pulse detector 32 for detecting the rotation speed of a disc motor 36 and supplies the control signal 35 to the disc motor 36.

The CAV/CLV motor controller 23 controls the CLV system when the instruction signal 27 for addressing the AUDIO-CD is input from the system controller 11. That is, in this case, the CAV/CLV motor controller 23 compares a reference signal, i.e., affixed divided frequency of the x'tal-based clock 21a which is output from the clock generator 20 with the PLL system frame sync signal 22, and generates the control signal 35 corresponding to an error resulted from the comparison. Further, the CAV/CLV motor controller 23 selects either the CAV system or the CLV system when the instruction signal 27 for addressing the CD-ROM is input from the system controller 11.

The system controller 11 controls the overall operations of the CD-ROM including a search, ON/OFF operations for a variety of circuits. Furthermore, the system controller 11 determines whether the main data is an AUDIO-CD data or a CD-ROM data based on a subcode data demodulated in the CD signal processor 16 and outputs the AUDIO-CD/CD-ROM switching instruction signal 27 to the selectors 17 and 24 for instructing standard-speed reproduction using the CLV system in the case of CD-ROM data, or reproduction using the CAV system or the CLV system in case of the AUDIO-CD data.

Figure 2:
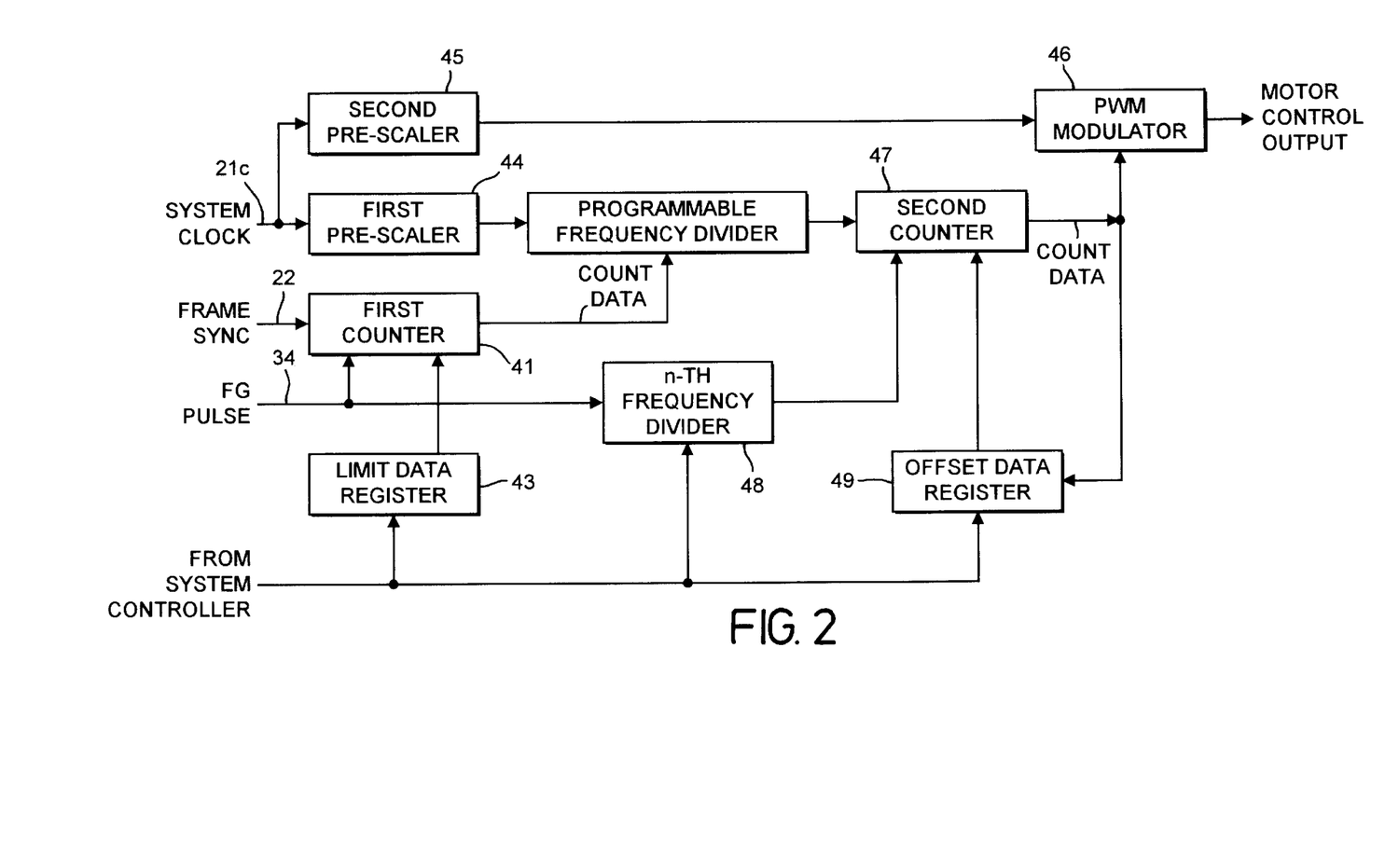
FIG. 2 is a block diagram for illustrating the configuration of a CAV/CLV motor controller shown in FIG. 1.

FIG. 2 shows a block diagram of the CAV/CLV motor controller 23. In FIG. 2, control sections associated with the AUDIO-CD/CD-ROM switching instruction signal 27 from the system controller 11 are omitted.

In the CAV/CLV motor controller 23, the FG pulse 34 supplied from the FG pulse detector 32 and the frame sync signal 22 supplied from the CD signal processor 16 are input to a first counter 41. Here, the frame sync signal 22 has a frequency of 7.35 kHz during standard-speed CLV system reproduction. The first counter 41 counts the frame sync signals 22 during one FG pulse cycle. Further, the first counter 41 has a function to compare its counted value with a limit value which is preset in a limit data register 43 and if a count value is larger than a limit value, the count value is output to a programmable frequency divider 42 and if a count value is less than a limit value, the limit value is output to the programmable frequency divider 42.

On the other hand, the system clock 21c is input to a first pre-scaler 44 and a second pre-scaler 45. The system clock 21c is 16.9344 MHz. The first pre-scaler 44 divides the input system clock 21c by P1 (e.g., P1=9) and outputs the divided system clock to the programmable frequency divider 42. The second pre-scaler 45 divides the system clock 21c by P2 (e.g., P2=3) and outputs the divided system clock to a PWM modulator 46. The programmable frequency divider 42 further divides the frequency-divided clock supplied from the first pre-scaler 44 by the count value of the first counter 41 and outputs the divided clock to a second counter 47. Further, the FG pulse 34, supplied from the FG pulse detector 32, is input to an n-th frequency divider 48. The n-th frequency divider 48 divides the FG pulse 34 by a multi-speed reproduction factor n using the CLV system and outputs the divided frequency to the second counter 47.

The second counter 47 counts the output clocks of the programmable frequency divider 42 in one cycle of the n-th division FG pulse and outputs the count value to the PWM modulator 46. Definitely, this second counter 47 is comprised of a down counter having such a preset value that an output count value becomes zero when the disc motor 36 is rotating at a specified rotation speed associated with a track position.

The PWM modulator 46 generates motor driving voltage to be supplied to the disc motor 36 from the divided clock from the second pre-scaler 45 and the output value of the second counter 47. That is, a duty ratio of the motor driving voltage is controlled based on the output value of the second counter 47 using the divided clock from the second pre-scaler 45 as a motor driving voltage frequency to be generated.

A limit value in the limit data register 43 and the divisor value n of the n-th frequency divider 48 are defined by the system controller 11.

Next, the operation of the CAV/CLV motor controller 23 will be explained.

A time for one disc rotation at a track position is expressed by $(2\pi R)/(LV \cdot n)$. Where, R is a distance from the center of a disc at an applicable track position, LV is a linear velocity rotation of data recorded on the disc, and n is a multi-speed reproduction factor.

Further, the number of frame sync signals which are input within a time for one disc rotation is $((2\pi R)/(LV \cdot n)) \cdot n \cdot 7350 = ((2\pi R)/LV) \cdot 7350$, where 7350 is the number of frame sync signals per second at the standard-speed CLV system reproduction.

Accordingly, the number of frame sync signals in one cycle of FG pulse at the applicable track position, which is the output of the first counter 41 will be $((2\pi R)/LV) \cdot 7350 \cdot (1/FG)$, where FG is the number of FG pulses per a rotation of the disc motor.

Therefore, the output frequency of the programmable frequency divider 42 to divide the output of the first pre-scaler 44 using the output of the first counter 41 as a frequency divided value will be $fs \cdot (1/P1) \cdot ((LV \cdot FG)/(2\pi \cdot 7350))$, where fs is system clock frequency and P1 is the divided frequency of the first pre-scaler.

In the case of a disc carrying signals recorded using the CLV system, the number of frame sync signals for one cycle of the FG pulse is constant for each track position. So, the system clock frequency obtained by dividing the system clock divided by a fixed frequency dividing value P1 which is further divided by the number of frame sync signals for one cycle of the FG pulse will take a value reflecting the track position (regardless of the rotation speed of the disc motor).

When the disc motor 36 is rotating at a specified rotation speed associated with a track position in the CLV system reproduction, the number of output clocks of the programmable frequency divider 42 for one cycle of the FG pulse output from the second counter 47 is constant at any track position.

That is, the FG pulse cycle is $(2\pi R)/(LV \cdot n \cdot FG)$ and the cycle after dividing the FG pulse by the n-th frequency divider 48 is $(2\pi R)/(LV \cdot FG)$. The number of output clocks of the programmable frequency divider 42 in this cycle is $((2\pi R)/(LV \cdot FG)) \cdot fs \cdot (1/P1) \cdot ((LV \cdot FG)/(2\pi R \cdot 7350)) = fs \cdot (1/P1) \cdot (1/7350)$. Therefore, when assuming that fs is 16.9344 and P1 is 9, the number of output clocks of the programmable frequency divider 42 in one cycle after n-th division of FG pulse will become 256. This value will become constant if the disc motor 36 rotates at a specified rotation speed associated with a track position, regardless of the position of the currently read track, the normal linear velocity value of the recorded data of a disc and the number of FG pulses during one rotation of the disc motor.

Accordingly, if there is an error between the rotation speed of the disc motor 36 and a target rotation speed associated with the current track position, the number of output clocks of the second counter 47 differs from a specific value 256 by an error. For eliminating the error from the specific value 256, the PWM modulator 46 generates a motor control voltage (having a constant frequency) of a duty ratio associated with the output of the second counter 47 and applies it to the disc motor 36. Thus, CLV control of the disc motor 36 is carried out.

Further, the second counter 47 is comprised of a down counter having a preset value of 256 which is reset for every cycle of the output of the n-th frequency divider 48. The down counter counts down by 1 for every pulse applied from the programmable frequency divider 42 after reset, and outputs a count-down value immediately before every reset to the PWM modulator 46.

The operation described above is called proportional control. In such a proportion control, if an error in the rotation speed of the disc motor 36 from the target rotation speed is eliminated, an acceleration or a deceleration to the disc motor 36 is removed. The disc motor 36 actually maintains the rotation at an almost constant speed equal to or slightly lower than a target rotation speed at a state where the lead-in operation to the target rotation speed is completed. That is, the output count value of the second counter, i.e., the down counter 47 will become slightly larger than zero (0), after the completion of the lead-in operation to the target speed of the disc motor 36.

The CD-ROM reproducing apparatus in this embodiment is so configured that the output count value of the second counter 47, after the lead-in operation to the target speed of the disc motor 36 is completed, is set into an offset data register 49 as an offset data and then a preset value of the second counter 47 is offset by the offset data value. Thus, even when the error between the rotation speed of the disc motor 36 and the target rotation speed is eliminated, the output count value of the second counter 47 is prevented from falling to zero. Accordingly, the driving electric power corresponding at least to the offset data value is supplied to the disc motor 36. Thus, it becomes possible to further reduce the error between the rotation speed of the disc motor 36 and the target rotation speed after the lead-in operation of the rotation speed is completed.

Further, the setting of the offset data into the offset data register 49 can be made through the system controller 11 or the output count value of the second counter 47, after the completion of the preceding lead-in operation of the rotation speed, may be taken into the offset data register 49.

Hereinafter, the switching between the CLV control and the CAV control of the disc motor in the CD-ROM reproducing apparatus will be explained.

As described above, the first counter 41 for counting the frame sync signals 22 during one cycle of the FG pulse is so configured that it compares its output count value with a limit value which is preset in the limit data register 43, and then provides the count value to the programmable frequency divider 42 if the count value is larger than the limit value, while providing the limit value to the programmable frequency divider 42 if the count value is less than the limit value.

The number of frame sync signals 22 during one cycle of FG pulse is expressed by $[(2\pi R)/LV] \cdot 7350$. As the expression contains a factor of R (a distance of current track from the disc center) in the dividend, it is known that the number of frame sync signals 22 is small within the inner data area of a disc, while being relatively large within the outer data area of a disc.

The count value of the first counter 41 being larger than the limit value means that the current reading position is located on the outer side from the track position specified by the limit value. The count value of the first counter 41 being less than the limit value means that the current reading position is located on the inner side from the track position specified by the limit value.

Figure 3:
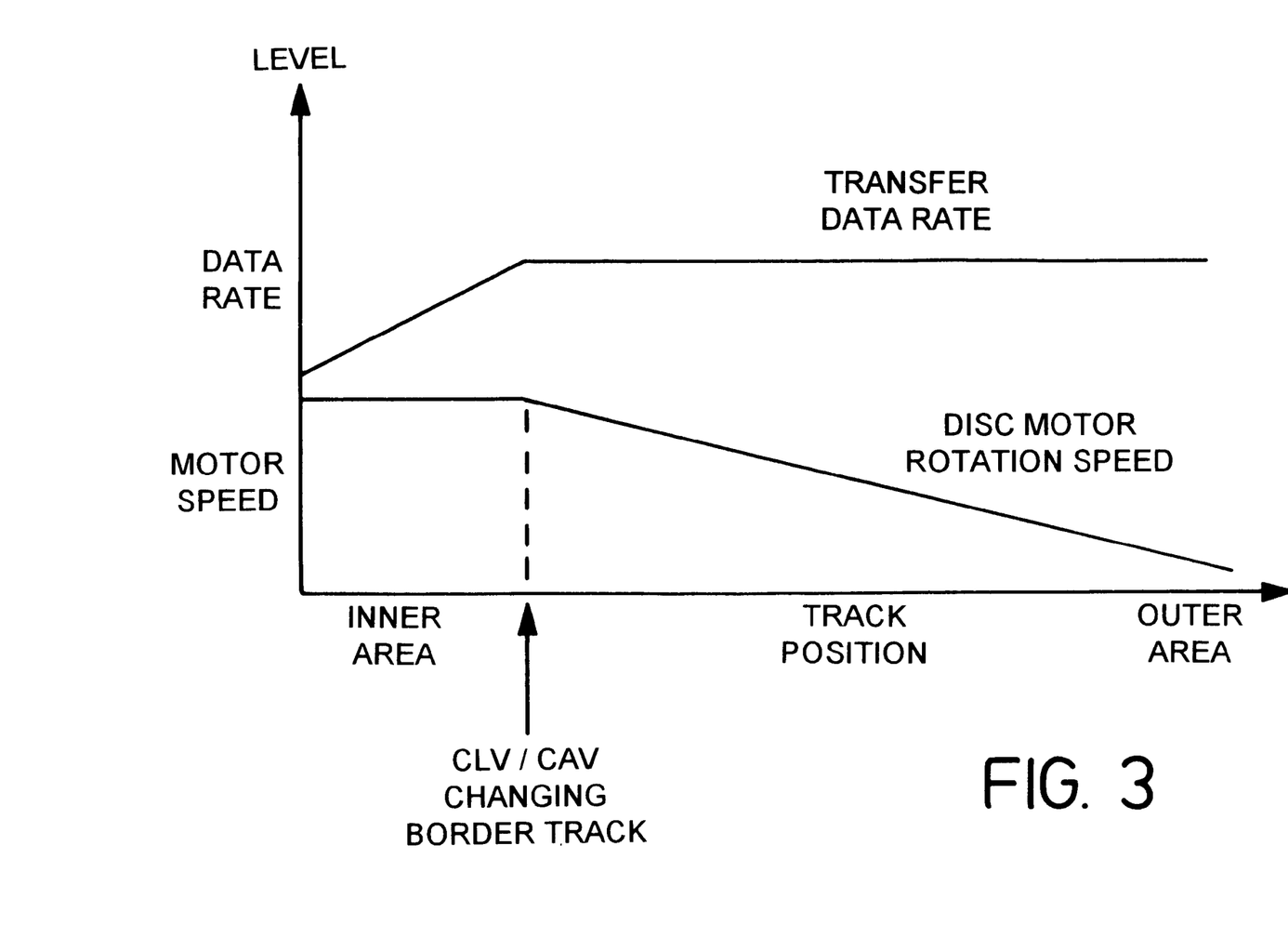
FIG. 3 is a diagram for illustrating the relationship between a track position on a disc, a rotation speed of a disc motor and a signal transfer rate.

Accordingly, the CLV control for the disc motor 36, as described above, is executed when the current reading position is located on the outer side of the disc from the track position specified by the limit value, as shown in FIG. 3. On the other hand, when the current reading position is located on the inner side of the disc from the track position specified by the limit value, the limit value is provided to the programmable frequency divider 42 as the output of the first counter 41, in place of the count value. As the limit value has a constant value, as long as the reading position is located on the inner side from the track position specified by the limit value, the disc motor 36 rotates at a constant rotation speed associated with the limit value. Thus CAV control for the disc motor 36 is executed.

Thus, according to the CD-ROM reproducing apparatus in this embodiment, reproduction from the outer data area of the disc bordered by the track position specified by the limit value is carried out using the CLV system, while reproduction from the inner data area of the disc is carried out using the CAV system. Thus, it is possible to reduce the maximum rotation speed during the reproduction from the inner data area by using the CAV system where the rotation speed is apt to increase using the CLV system as in the conventional apparatus. Accordingly, the burden on the disc motor 36 is also significantly reduced. As a result, it becomes possible to reduce dependency on the performance of the disc motor in achieving high-speed reproduction and to realize a reduction in size and a decrease in weight of the disc motor and also a reduction in size and a lowering of cost of the apparatus.

Further, in this CD-ROM reproducing apparatus, because the CAV system reproduction is executed only in the inner data area of the disc, the rotation speed during reproduction of the inner data area is carried out at a constant linear velocity defined for the specific bordering track which divides the data area of the disc into the inner data area and the outer data area. Accordingly, it is assured that the reproduction signal rate for the reproduction of the inner data area of the disc, using the CAV system, falls within a range of data processing capacity.

Hereinafter, still another preferred embodiment of the present invention will be explained.

When the frequency of the system clock 21c to be applied to the CAV/CLV motor controller 23 and the data processor varies in accordance with the track position only in the inner data area of a disc, where the CAV system reproduction is executed, it is possible to reproduce the outer data area of a disc by the CLV system and reproduce the inner data area of a disc by the CAV system like the embodiment described above.

Figure 4:
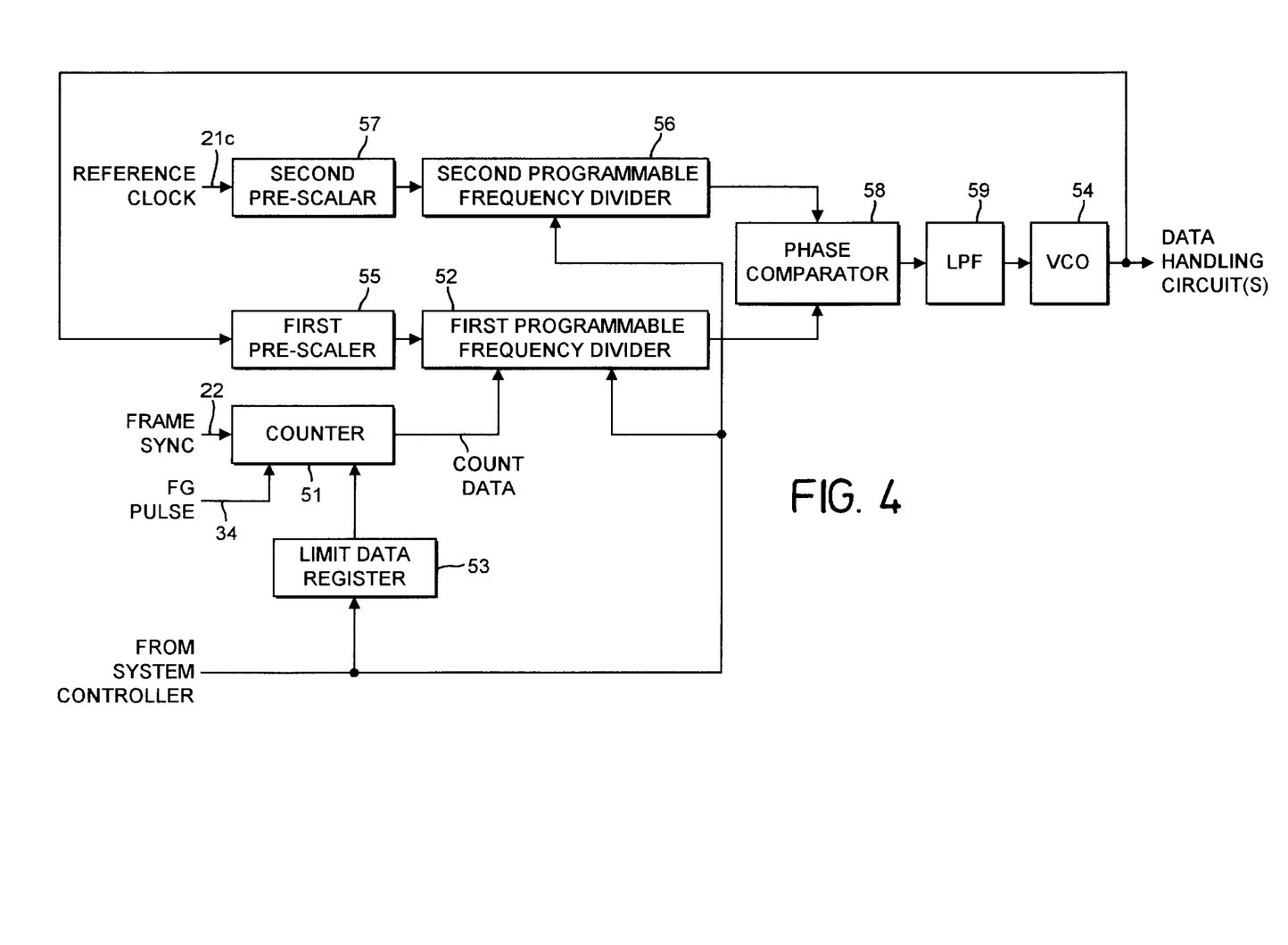
FIG. 4 is a block diagram for illustrating the configuration of a variable controller of system clock frequency which is applied to a CAV/CLV motor controller and a data processor according to another preferred embodiment of the present invention.

FIG. 4 shows an example of the circuit arrangement to perform variable control of the system clock frequency to be applied to the CAV/CLV motor controller and the data processor A counter 51 receives the FG pulse 34 from the FG pulse detector 32 and the frame sync signal 22 from the CD signal processor 16, and then counts the frame sync signals 22 during one cycle of an FG pulse. The counter 51 compares its count value with a limit value which is preset in a limit data register 53, and supplies value to a first programmable frequency divider 52 if the count value is higher than the limit value (when accessing the outer data area of the disc), while supplying the count value to the first programmable frequency divider 52 if the count value is lower than the limit value (when accessing the inner data area of a disc).

The first programmable frequency divider 52 further divides the oscillation frequency of a VCO 54, which is previously divided by a first pre-scaler 55, by a counter value of the counter 51, and outputs the divided oscillation frequency to a phase comparator 58. The phase comparator 58 detects a phase difference between an output signal of the first programmable frequency divider 52 and an output of a second programmable frequency divider 56. That is, a signal obtained by dividing the reference system clock 21c by a second pre-scalar 57, and further dividing it by a preset value from the system controller 11, is provided to the VCO 54, as an error signal, via an LPF 59.

Now, if the reading position is in the outer data area of the disc, a fixed limit value is preset into the first programmable frequency divider 52. A phase difference between the output signal of this first programmable frequency divider 52 and the output signal of the second programmable frequency divider 56 is stable at a value close to zero. Thus, the oscillation frequency of the VCO 54, that is, the frequency of the system clock 21c to be applied to the CAV/CLV motor controller and the data processor is kept constant. As a result, it becomes possible to execute the reproduction of the outer data area of a disc, using the CLV system, bordering at a track position which is specified by the limit value.

Further, if the current reading track is located in the inner data area of a disc, a count value of the counter 51, which is lower than the limit value, is preset to the first programmable frequency divider 52. Then, a phase difference corresponding to the difference between the limit value and the count value occurs between the outputs of the programmable frequency dividers 52 and 56. This phase difference is detected by a phase comparator 58 and then supplied to the VCO 54 via the LPF 59 as an error signal. Therefore, the oscillation frequency of the VCO 54, that is, the frequency of the system clock 21c to be applied to the CAV/CLV motor controller 23 and the data processor decreases when the current reading track on the disc approaches the innermost track of the disc from the track specified by the limit value. Thus, it becomes possible to execute the reproduction of the inner data area of the disc using the CAV system.

As described above, the present invention can provide an extremely preferable disc reproducing method and a disc reproducing apparatus. The disc reproducing method and the disc reproducing apparatus according to the present invention can execute reproduction of the inner data area of the disc, where data are recorded at a very high rotation speed using the CLV (Constant Linear Velocity) system, using the CAV (Constant Angular Velocity) system. Thus, it becomes possible to reduce the maximum rotation speed of the disc motor and the burden on the disc motor and mechanical vibration occurring thereby.

Further, according to the present invention, the inner data area, divided from the outer data area by the specific track, is read using a CAV system with a specified angular velocity which corresponds to the CLV system rotation speed for reading the specific track. Thus it is assured that the transition between the CAV system, for reading the inner data area, to the CLV system, for reading the outer data area is performed smoothly and that the reproducing signal rate, when reproducing the disc using the CAV system, falls within the range of the data processing capacity.

Furthermore, according to the present invention, it is possible to easily design hardware for the means of determining to which area the currently read track belongs, together with the FG pulse detecting means. It is also possible to easily design a hardware for all or a part of the controlling means, once hardware has been designed for the determining means.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application. Such alternative inventive concepts could be defined by claims differing in scope from the following claims, such claims differing in scope may be adopted subsequently during prosecution, for example, for the purposes of a divisional application.

What is claimed is:

1. A disc reproducing method for reproducing a disc having signals recorded thereon at a constant linear velocity rotation comprising:
    dividing a CLV record data area on a disc into an inner data area and an outer data area by a given track as an imaginary border;
    reading data from the inner data area using a CAV system; and
    reading data from the outer data area using a CLV system.

2. A disc reproducing method for reproducing a disc having signals recorded thereon at a constant linear velocity rotation comprising:
    dividing a CLV record data area on a disc into an inner data area and an outer data area by a given track as an imaginary border;

reading data from the inner data area using a CAV system with a specified angular velocity corresponding to a CLV system rotation speed for reading a specific track; and reading data from the outer data area using a CLV system.

3. A disc reproducing apparatus for reproducing a disc having signals recorded thereon at a constant linear velocity rotation comprising:

setting means for setting information for dividing a CLV record data area of a disc at a given track as an imaginary border into an inner data area including the given track and an outer data area;

determining means for determining to which area a position of a currently read track belongs; and control means for controlling the disc reproducing apparatus to read the signals using a CLV system if the determined position of the currently read track belongs to the outer data area of a disc and for controlling the disc reproducing apparatus to read the signals using a CAV system if the determined position of the currently read track belongs to the inner data area.

4. A disc reproducing apparatus for reproducing a disc having signals recorded thereon at a constant linear velocity rotation comprising:

setting means for setting information for dividing a CLV record data area of a disc at a given track as an imaginary border into an inner data area including the given track and an outer data area;

determining means for determining to which area a position of a currently read track belongs; and control means for controlling the disc reproducing apparatus to read the signals using a CLV system if the determined position of the currently read track belongs to the outer data area, and for controlling the disc reproducing apparatus to read data from the inner data area using a CAV system with a specified angular velocity corresponding to a CLV system rotation speed for reading a specific track if the determined position of the currently read track belongs to the inner data area.

5. A disc reproducing apparatus for reproducing a disc having signals recorded thereon at a constant linear velocity rotation, the disc reproducing apparatus comprising:

a disc motor for driving the disc;

setting means for setting information for dividing a data area of the disc, using a given track as a border, into an inner data area, including the given track, and an outer data area;

FG pulse detecting means for detecting FG pulses generated from the disc motor;

determining means for determining to which area a position of the currently read track belongs based on the FG pulses detected by the FG pulse detecting means and frame synchronizing signals reproduced from the disc; and control means for controlling the disc reproducing apparatus such that the signals are read using a CLV system, if the determined position of the currently read track belongs to the outer data area of a disc divided based on the information set by the setting means, and such that the signals are read using a CAV system, if the determined position of the currently read track belongs to the inner data area of a disc divided based on the information set by the setting means.

6. A disc reproducing apparatus according to claim 5, wherein an output of the determining means is based on a predetermined value when the currently read track belongs to the inner data area and the output of the determining means is based on a number of the frame synchronizing signals counted during a period of time in which a given number of the FG pulses is counted when the currently read track belongs to the outer data area.

7. A disc reproducing apparatus according to claim 6, wherein the output of the determining means is a motor control voltage to be applied to the disc motor.

8. A disc reproducing apparatus according to claim 6, wherein the given number of the FG pulses is 1.

9. A disc reproducing apparatus according to claim 5, further comprising a variable controller for generating a system clock frequency for a data handling circuit, wherein:

the generated system clock frequency is based on the FG pulses detected by the FG pulse detecting means and the frame synchronizing signals reproduced from the disc.

10. A disc reproducing apparatus according to claim 9, wherein the system clock frequency generated by the variable controller is based on a fixed constant when the currently read track belongs to the outer data area and the system clock frequency is based on a number of the frame synchronization signals counted during a time period in which a given number of the FG pulses is counted when the currently read track belongs to the inner data area.

11. A disc reproducing apparatus according to claim 10, wherein the given number of the FG pulses is 1.

12. A disc reproducing method for reproducing a disc having signals recorded thereon at a constant linear velocity rotation, the method comprising:

dividing a data area on a disc into an inner data area and an outer data area using any given track as a border;

detecting FG pulses generated from a disc motor;

determining to which one of the inner data area and the outer data area a position of a currently read track of the disc belongs based on the FG pulses, detected in the step of detecting FG pulses, and a plurality of frame synchronizing signals reproduced from the disc; and controlling reading of the disc such that a CLV system is used if the determining step determines that the position of the currently read track belongs to the outer data area and a CAV system is used if the determining step determines that the position of the currently read track belongs to the inner data area.

13. A disc reproducing method according to claim 12, wherein the determining step comprises:

generating an output based on a predetermined value when the currently read track belongs to the inner data area; and generating the output based on a number of the frame synchronizing signals counted during a period of time in which a given number of the FG pulses is counted when the currently read track belongs to the outer data area.

14. A disc reproducing method according to claim 13, wherein the output of the determining step is a motor control voltage to be applied to the disc motor.

15. A disc reproducing method according to claim 13, wherein the given number of the FG pulses is 1.

16. A disc reproducing method according to claim 12, further comprising generating a system clock frequency for a data handling circuit, wherein:

the generated system clock frequency is based on the FG pulses detected during the detecting step and the frame synchronizing signals reproduced from the disc.

17. A disc reproducing method according to claim 16, wherein the step of generating the system clock frequency comprises:

setting the system clock frequency based a fixed constant when the currently read track belongs to the outer data area; and setting the system clock frequency based on a number of the frame synchronization signals counted during a time period in which a given number of the FG pulses is counted when the currently read track belongs to the inner data area.

18. A disc reproducing apparatus according to claim 17, wherein the given number of the FG pulses is 1.

* * * * *